United States Patent
Cho

(10) Patent No.: US 11,964,919 B2
(45) Date of Patent: Apr. 23, 2024

(54) METHOD FOR MANUFACTURING ACTIVE METAL-BRAZED NITRIDE CERAMIC SUBSTRATE WITH EXCELLENT JOINING STRENGTH

(71) Applicant: ZONE INFINITY CO., LTD., Gyeonggi-do (KR)

(72) Inventor: Inchul Cho, Gyeonggi-do (KR)

(73) Assignee: ZONE INFINITYCO., LTD., Gyeonggi-do (KR)

(*) Notice: Subject to any disclaimer, the term of this patent is extended or adjusted under 35 U.S.C. 154(b) by 582 days.

(21) Appl. No.: 17/054,978

(22) PCT Filed: Aug. 14, 2019

(86) PCT No.: PCT/KR2019/010400
§ 371 (c)(1),
(2) Date: May 14, 2021

(87) PCT Pub. No.: WO2020/036452
PCT Pub. Date: Feb. 20, 2020

(65) Prior Publication Data
US 2021/0269368 A1    Sep. 2, 2021

(30) Foreign Application Priority Data
Aug. 17, 2018 (KR) .................. 10-2018-0095942

(51) Int. Cl.
*B28B 11/08* (2006.01)
*C04B 35/581* (2006.01)
(Continued)

(52) U.S. Cl.
CPC ........ *C04B 37/023* (2013.01); *B28B 11/0818* (2013.01); *C04B 35/581* (2013.01);
(Continued)

(58) Field of Classification Search
CPC ... B28B 11/08; B28B 11/0818; C04B 35/581; C04B 35/584; C04B 35/62218;
(Continued)

(56) References Cited

U.S. PATENT DOCUMENTS

2002/0164475 A1* 11/2002 Imamura ............... C01B 21/068
257/E23.113

FOREIGN PATENT DOCUMENTS

| CN | 104860683 A | * | 8/2015 | ........... C04B 35/584 |
| JP | 2000049427 A | * | 2/2000 | ............. C04B 37/02 |

(Continued)

OTHER PUBLICATIONS

Translation of CN 104860683 A (published on Aug. 26, 2015).*
(Continued)

*Primary Examiner* — Leo B Tentoni
(74) *Attorney, Agent, or Firm* — IPLA P.A.

(57) ABSTRACT

A method for manufacturing active metal-brazed a nitride ceramics substrate having excellent joining strength, includes: a step of preparing a mixed raw material; a step of forming a green sheet of the mixed raw material by a tape casting method; a step of removing a binder by performing degreasing; a step of performing sintering; a step of forming an aluminum nitride sintered substrate by performing gradual cooling; and a step of printing a conductive wiring pattern with active metal paste on the aluminum nitride sintered substrate.

3 Claims, 1 Drawing Sheet

(51) Int. Cl.
    *C04B 35/584*     (2006.01)
    *C04B 35/587*     (2006.01)
    *C04B 35/622*     (2006.01)
    *C04B 35/63*     (2006.01)
    *C04B 35/634*     (2006.01)
    *C04B 35/638*     (2006.01)
    *C04B 35/64*     (2006.01)
    *C04B 37/02*     (2006.01)

(52) U.S. Cl.
    CPC ...... *C04B 35/587* (2013.01); *C04B 35/62218* (2013.01); *C04B 35/6303* (2013.01); *C04B 35/6342* (2013.01); *C04B 35/638* (2013.01); *C04B 35/64* (2013.01); *C04B 2235/3224* (2013.01); *C04B 2235/3225* (2013.01); *C04B 2235/3227* (2013.01); *C04B 2235/3229* (2013.01); *C04B 2235/3865* (2013.01); *C04B 2235/3878* (2013.01); *C04B 2235/6025* (2013.01); *C04B 2235/6565* (2013.01); *C04B 2235/6567* (2013.01); *C04B 2235/658* (2013.01); *C04B 2235/6582* (2013.01); *C04B 2237/124* (2013.01); *C04B 2237/125* (2013.01); *C04B 2237/366* (2013.01); *C04B 2237/368* (2013.01); *C04B 2237/407* (2013.01); *C04B 2237/52* (2013.01); *C04B 2237/60* (2013.01)

(58) Field of Classification Search
    CPC ... C04B 35/63; C04B 35/6303; C04B 35/634; C04B 35/6342; C04B 35/64; C04B 2235/3224; C04B 2235/3225; C04B 2235/3227; C04B 2235/6025; C04B 2235/658; C04B 2235/6582
    USPC ....... 264/619, 642, 646, 647, 650, 656, 657, 264/669, 670, 674, 676, 678, 683
    See application file for complete search history.

(56) References Cited

FOREIGN PATENT DOCUMENTS

| | | | | |
|---|---|---|---|---|
| JP | 2014005190 A | * | 1/2014 | ........... C04B 35/584 |
| KR | 19940002198 A | * | 2/1994 | ............. C04B 35/08 |
| KR | 20180058216 A | * | 5/2018 | ........... C04B 35/584 |

OTHER PUBLICATIONS

Translation of JP 2000049427 A (published on Feb. 18, 2000).*
Translation of JP 2014005190 A (published on Jan. 16, 2014).*
Translation of KR 19940002198 A (published on Feb. 16, 1994).*
Translation of KR 20180058216 A (published on May 31, 2018).*

* cited by examiner (a) CROSS-SECTIONAL STRUCTURE OF COPPER-BONDED $Si_3N_4$ SUBSTRATE (b) X-ray Mapping Analysis

METHOD FOR MANUFACTURING ACTIVE METAL-BRAZED NITRIDE CERAMIC SUBSTRATE WITH EXCELLENT JOINING STRENGTH

BACKGROUND

The present invention relates to a nitride-copper (Cu) wiring substrate having excellent joining strength between a nitride (AlN or $Si_3N_4$) and a copper plate, and more specifically, to a method for manufacturing an active metal-brazed nitride ceramic substrate which can be suitably used as a substrate for various high-power and large-capacity power modules due to high reliability based on excellent joining strength and high thermal conductivity and high heat dissipation, by performing gradual cooling at a speed of 100° C. or lower per hour after sintering, forming unevenness at surfaces of aluminum nitride and silicon nitride through sandblasting, and particularly using active metal brazed copper (AMC).

Ceramic substrates such as alumina, beryllia, silicon nitride, and aluminum nitride are mainly used as circuit boards used for power modules and the like for reasons of thermal conductivity, cost, and safety and so on.

These ceramic substrates are used as circuit boards by bonding a metal circuit board or a heat sink such as copper or aluminum. Also, the ceramic substrates are used as a substrate for mounting highly heat-dissipating electronic components thereon due to characteristics such as excellent insulation and heat dissipation properties with respect to a resin substrate or a metal substrate using a resin layer as an insulating material.

In addition, for power modules such as elevators, vehicles, hybrid cars, etc., a ceramic circuit board is used in which a metal circuit board is bonded to the surface of the ceramic substrate with an active metal solder material, and semiconductor elements are mounted at a predetermined position on the metal circuit board.

Recently, the ceramic substrates made of aluminum nitride sintered bodies or silicon nitride sintered bodies having high thermal conductivity have been used to increase the amount of heat generated from semiconductor elements due to high integration, high frequency, and high output of the semiconductor elements.

In particular, the aluminum nitride substrate is suitable as a ceramic circuit board for mounting high heat dissipation electronic components thereon because of its high thermal conductivity compared to the silicon nitride substrate.

However, the aluminum nitride substrate has a high thermal conductivity, but low mechanical strength or toughness, and thus it has a disadvantage that a crack occurs due to tightening in the assembly process or the crack can be easily generated when a thermal cycle is added.

In particular, when it is applied to the power module, which is applied under severe loads and thermal conditions such as automobiles, electric railways, machine tools or robots, these disadvantages become remarkable.

For this reason, the ceramic substrate for mounting electronic components is required to improve mechanical reliability, and a silicon nitride substrate having excellent mechanical strength and toughness is attracting attention, although its thermal conductivity is lower than that of the aluminum nitride substrate.

The ceramic circuit board using such a nitride ceramic substrate is produced by an active metal boding method.

Such an active metal boding method is a method of bonding a metal plate on a ceramic substrate through a solder material layer containing an active metal such as a group 4A element or a group 5A element. In general, a silver-copper-titanium-based solder material is screen-printed on main surfaces of the silicon nitride substrate, a metal circuit board and a metal heat sink are disposed on the printed surface, and the ceramic substrate and the metal plate are bonded to each other by heat treatment at an appropriate temperature.

In order to use the nitride ceramic sintered body as a semiconductor substrate, it is necessary to form a surface conductor layer for wiring. The methods of forming the surface conductor layer includes an active metal boding method in which copper plates are integrally bonded on the sintered substrate as a conductor layer using an active metal or a metallization method in which a conductor pattern is formed by using a printing paste containing a conductive material having high melting point such as tungsten (W) and molybdenum (Mo), and the substrate and the conductor layer are integrally formed by firing simultaneously with the substrate material.

In the nitride ceramic substrate, some of the active metal boding methods have been put into practical use and is used for special purposes. On the other hand, the simultaneous firing metalizing method has been studied to expand its use. However, since there are disadvantages in bonding strength and electrical resistance (conductivity), its improvement is required.

SUMMARY OF THE INVENTION

The present invention is made to solve the problems described above, and an object of the present invention is to provide a method for manufacturing a nitride ceramics wiring substrate having a conductor layer which is high in joining strength and conductivity and particularly having high thermal conductivity and high heat dissipation in addition to the primary property of high strength of a nitride ceramics sintered body, in which the active metal brazing copper bonding method is substituted for a DBC high melting point metallizing method in the related art.

In order to achieve the objects, the present invention provides a method for manufacturing active metal-brazed a nitride ceramics substrate having excellent joining strength, including: a step of preparing a mixed raw material by adding 3 wt. % of $Y_2O_3$ and 1 wt. % of one or two rare-earth elements ($La_2O_3$, $Gd_2O_3$, $Ce_2O_3$, $Dy_2O_3$, and $Yb_2O_3$) as a sintering aid to 10 wt. % of aluminum nitride powder having a β-phasing rate of 90% or higher and 86 wt. % of α-type aluminum nitride powder; a step of forming a green sheet of the mixed raw material by a tape casting method; a step of removing a binder by performing degreasing at a temperature of 400 to 700° C. for two to five hours in a nitrogen gas atmosphere; a step of performing sintering at a temperature of 1,800 to 1,900° C. for two to ten hours under 1 to 10 atm of nitrogen and hydrogen gas; a step of forming an aluminum nitride sintered substrate by performing gradual cooling at a speed of 50 to 100° C. per hour; and a step of printing a conductive wiring pattern with active metal paste on the aluminum nitride sintered substrate.

Here, the active metal paste used in printing the conductive wiring pattern on the aluminum nitride sintered substrate is Ag—Cu paste containing one or two or more active metal selected from the group consisting of Ti, Zr, Hf, Mo, Ta, Nb, $TiO_2$, TiN, $ZrO_2$, ZrN, $Y_2O_3$, and $SiO_2$.

In addition, the method for manufacturing active metal-brazed a nitride ceramics substrate having excellent joining strength further includes a step of forming unevenness at a surface of the aluminum nitride sintered substrate by a sandblasting method to further increase the joining strength.

In order to achieve the objects, the present invention provides a method for manufacturing active metal-brazed a nitride ceramics substrate having excellent joining strength, including: a step of preparing a mixed raw material by adding 1 to 20 mass % of a converted oxide from a rare-earth element to silicon nitride powder containing 1.0 mass % or smaller of oxygen and 85 mass % or larger of α-phase silicon nitride; a step of forming a green sheet of the mixed raw material by a tape casting method; a step of removing a binder by degreasing the green sheet forming body at a temperature of 400 to 700° C. for two to five hours in a nitrogen gas atmosphere; a step of performing sintering at a temperature of 1,750 to 1,900° C. for ten to twenty hours under 1 to 10 atm of nitrogen and hydrogen gas; a step of forming a silicon nitride sintered substrate by performing gradual cooling at a speed of 50 to 100° C. per hour; and a step of printing a conductive wiring pattern with active metal paste on the silicon nitride sintered substrate.

Here, the active metal paste used in printing the conductive wiring pattern on the silicon nitride sintered substrate is Ag—Cu paste containing one or two or more active metal selected from the group consisting of Ti, Zr, Hf, Mo, Ta, Nb, $TiO_2$, TiN, $ZrO_2$, ZrN, $Y_2O_3$, and $SiO_2$.

In addition, the method for manufacturing active metal-brazed a nitride ceramics substrate having excellent joining strength further includes a step of forming unevenness at a surface of the silicon nitride sintered substrate by a sandblasting method to further increase the joining strength.

According to the present invention described above, it is possible to manufacture a nitride ceramics wiring substrate particularly having high reliability due to the excellent joining strength and having high thermal conductivity and high heat dissipation, along with a primary property of high-strength of a nitride ceramics (AlN or $Si_3N_4$) sintered body.

BRIEF DESCRIPTION OF DRAWINGS

The above and other objects, features and advantages of the present invention will be more apparent from the following detailed description taken in conjunction with the accompanying drawings, in which.

DETAILED DESCRIPTION OF THE INVENTION

Figure 1:
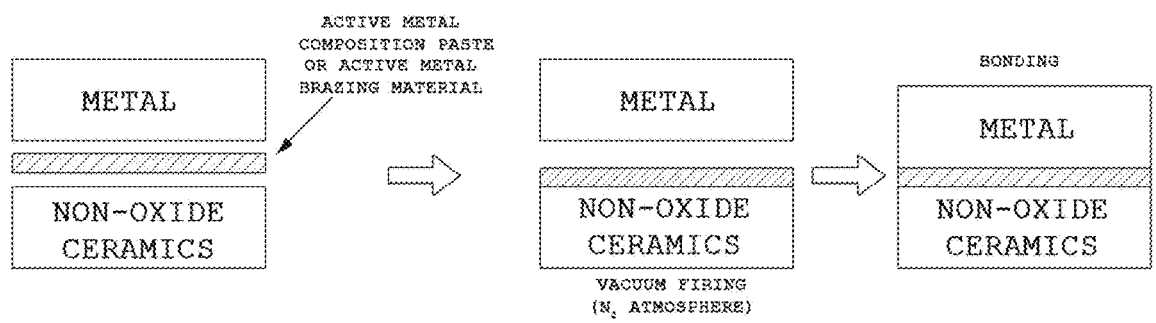
FIG. 1 is a view illustrating an active metal bonding method.

Hereinafter, embodiments of the present invention will be described in detail with reference to the accompanying drawings.

Hereinafter, the preferred example of a nitride ceramics (AlN or $Si_3N_4$) substrate of the present invention will be described.

In order to manufacture an active metal-brazed nitride ceramics substrate having excellent joining strength according to the present invention, two types of silicon nitride mixed powder having an average grain size of 0.7 µm or 1.0 µm and containing 1.0 mass % or smaller of oxygen and 85 mass % or larger of α-phase aluminum nitride (AlN) or silicon nitride ($Si_3N_4$) are prepared as a main material.

In this case, when an oxygen content is larger than 1.0 mass %, a problem arises in that a maximum pore diameter in a crystal grain boundary phase increases and thus the thermal conductivity decreases. In addition, when an α-phase silicon nitride content is smaller than 85 mass %, it is difficult to perform a sintering process.

Besides, a mixed raw material prepared by adding 1 to 20 mass % of a converted oxide from one or two or more rare-earth element ($La_2O_3$, $d_2O_3$, $Ce_2O_3$, $Dy_2O_3$, $Gd_2O_3$, and $Yb_2O_3$) to nitride (AlN or $Si_3N_4$) powder is formed into a green sheet by a tape casting method. In this case, when a rare-earth oxide content is smaller than 1 mass %, a problem arises in that the thermal conductivity decreases. In addition, when the rare earth oxide content is larger than 20 mass %, a problem arises in that a physical property such as three-point bending strength is not sufficient.

Then, a green sheet forming body is increased in temperature from 1,600° C. to 1,750 to 1,900° C. at a speed of 300° C. or lower per hour, left at 0.1 to 1 Mpa of mixed gas of nitrogen and hydrogen for two to twenty hours, then cooling is performed to 1,500° C. at a speed of 100° C. or lower per hour, and thereby a silicon nitride sintered substrate is produced. In this case, when the cooling of a sintered body to reach a temperature at which a liquid solidifies after sintering is gradually performed at a cooling speed of 100° C. or lower per hour, a reduction of oxygen concentration in the liquid and crystallization of a grain boundary phase of a silicon nitride sintered body are promoted, and thus a silicon nitride wiring substrate having more improved insulation and thermal conductivity can be obtained. When the cooling is rapidly performed at a cooling speed of higher than 100° C. per hour, a grain boundary phase of a sintered body structure becomes an amorphous phase (glass phase), so a ratio of a crystal phase of a liquid generated at the sintered body to the grain boundary phase is smaller than 20%, thus the thermal conductivity particularly decreases. In addition, when the sintering temperature is lower than 1,750° C., the sintered body has insufficient densification and a porosity fraction of 2.5 vol % or higher, and thus mechanical strength and the thermal conductivity both decreases. When the sintering temperature is higher than 1,900° C., a problem arises in that silicon nitride components are evaporated and decomposed.

Besides, a conductive wiring pattern is printed with active metal paste on the silicon nitride sintered substrate. Here, the active metal paste is prepared by preferably adding 0.5 to 3.0 mass % of one or two or more selected from the group consisting of Ti, Zr, W, Mo, Ta, Nb, Hf, V, Cr, $Y_2O_3$, $ZrO_2$, $CeO_2$ $TiO_2$, TiN, and the like. In this case, when an active metal paste content is smaller than 0.5 mass %, heat resistance of the substrate decreases. In addition, when the active metal paste content is larger than 3.0 mass %, a problem arises in that the joining strength decreases.

The active metal paste is prepared by using an Ag—Cu alloy-brazed material. Copper plate joining is performed by using Ag—Cu paste containing one or two or more active metal selected from the group consisting of Ti, Zr, Hf, Mo, Ta, Nb, and the like. The Ag—Cu paste preferably contains 2.5 mass % of active metal. In addition, Al joining is performed by preferably printing a pattern with Al—Si alloy paste and performing a brazing heat treatment at a temperature of 800 to 1,000° C. in a nitrogen gas atmosphere using a vacuum electric furnace.

Hereinafter, such an active metal bonding (AMB) method will be described in detail.

The active metal bonding method is suitable for non-oxide ceramics bonding and is used in bonding of a metal and non-oxide ceramics such as $Si_3N_4$, AlN, or SiC. In general, the active metal is made to have a basic composition of Ag and Cu and an additional composition of Ti, TiN, Sn, $Y_2O_3$, $ZrO_2$, $SiO_2$, $Li_2O_3$, Mo, $TiO_2$, or the like.

Besides, active metal of Ti, TiN, and $TiO_2$ is added to a composition of a bonding material to obtain better spreadability of ceramics, and the ceramics and the metal can be bonded to each other by heating once. In addition, adding of the active metal enables to obtain excellent bonding characteristics at bonding of ceramics and other ceramics.

FIG. 1 is a view illustrating the active metal bonding method. In the active metal bonding method, bonding can be performed only through a heating process on applied active metal (printing method or active metal thin plate) or the like, can be performed through a simple process, can be suitable for joining of ceramics in a broad sense, and can be performed on both an oxide and a non-oxide.

Factors affecting the joining strength of such a metal circuit board and the silicon nitride substrate are wetting and spreading between joining materials, strength of an interfacial product, and an interfacial structure.

In the present invention, in order to increase the joining strength of the metal circuit board, unevenness is formed at a surface of the silicon nitride to induce wetting and spreading of the active metal and increase the joining strength.

Here, a surface treatment is performed to form unevenness at the surface of silicon nitride by a sandblasting method, form an uneven layer by oxidizing the surface of silicon nitride at a temperature of 700 to 1,000° C. for a half to two hours, or form unevenness by an acid treatment method with HCl, HCl+HCl+$H_2SO_4$, HF, or the like, an etching method with $CHF_4$ gas, an etching method with electronic beam, or the like. Then, printing with the active metal paste is performed, and the brazing heat treatment is performed under a mixed gas atmosphere of nitrogen and hydrogen.

In addition, it is possible to use a method of performing the surface treatment to form unevenness, forming an electroless Ni—B plating layer, and performing the heat treatment on the metal plate with an Ag—Cu brazing composition at 800 to 1,000° C. in the mixed gas atmosphere of hydrogen and nitrogen to bond the metal plate.

Figure 2:
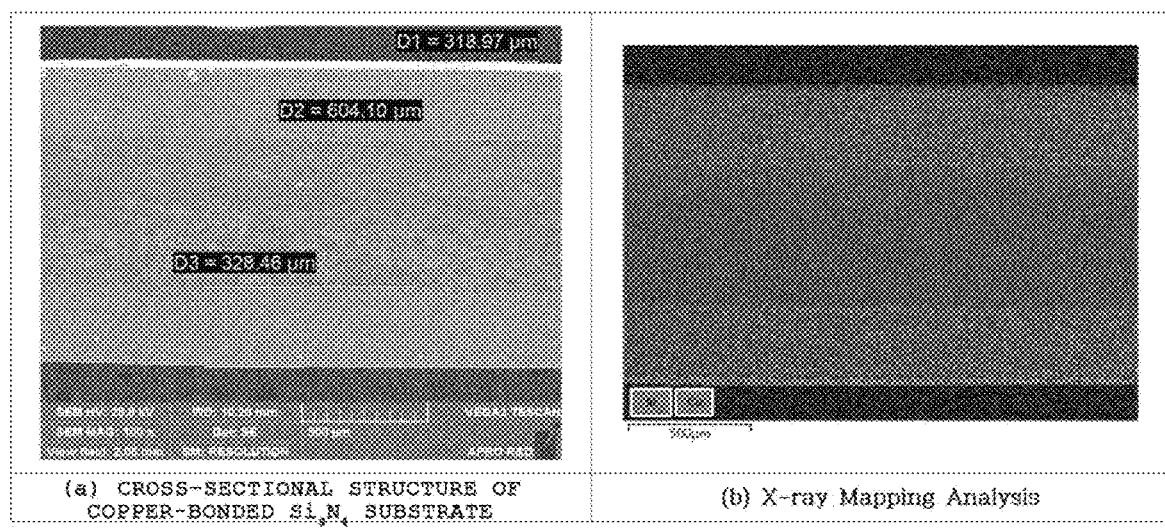
FIG. 2 is a diagram illustrating copper-bonded $Si_3N_4$ substrate cross-sectional structure (a) and X-ray mapping analysis (b) through analysis of microstructure by cross section SEM and EDS X-ray mapping analysis.

FIG. 2 is a diagram illustrating copper-bonded $Si_3N_4$ substrate cross-sectional structure (a) and X-ray mapping analysis (b) through analysis of microstructure by cross section SEM and EDS X-ray mapping analysis. A silicon nitride substrate and a copper-metal plate which are obtained by the method described above have the joining strength of 10 to 20 KN/m.

Hereinafter, for the easy understanding of the present invention, examples will be provided and described in detail. However, the examples according to the present invention can be modified into various different embodiments, and the scope of the present invention is not to be construed to be limited to the following examples. The examples of the present invention are provided to describe the present invention in more detail to those of ordinary knowledge in the art.

Hereinafter, the joining strength of an active metal composition ratio and a sample having the composition ratio will be described.

Table 1 below shows production of paste by changing a component ratio of a brazing material and an active metal material. An $Si_3N_4$ ball is put in an $Si_3N_4$ pot, and samples 1 to 11 are primarily mixed at a rotation speed of 40 rpm for 48 hours. A total amount of 300 g of active metal powder and brazing metal powder is set as 1 batch, and 70 g of ethyl alcohol is put in as a solvent.

TABLE 1

(Unit: wt %)

| Samples | Brazing Material | | Active Material | | | | Total |
|---|---|---|---|---|---|---|---|
| | Ag | Cu | Ti | $Y_2O_3$ | $ZrO_2$ | $SiO_2$ | |
| 1 | 70 | 27 | 3 | | | | 100 |
| 2 | 70 | 25 | 5 | | | | 100 |
| 3 | 70 | 27.9 | 2 | 0.1 | | | 100 |
| 4 | 72 | 25.5 | 2 | 0.5 | | | 100 |
| 5 | 72 | 25.0 | 2 | 1.0 | | | 100 |
| 6 | 72 | 25.8 | 2 | 0.1 | 0.1 | | 100 |
| 7 | 72 | 25.0 | 2 | 0.5 | 0.5 | | 100 |
| 8 | 72 | 24.0 | 2 | 1.0 | 1.0 | | 100 |
| 9 | 72 | 25.8 | 2 | 0.1 | | 0.1 | 100 |
| 10 | 72 | 25.0 | 2 | 0.5 | | 0.5 | 100 |
| 11 | 72 | 24.0 | 2 | 1.0 | | 1.0 | 100 |

Primarily mixed metal powder (brazing metal powder+ active metal powder) is sieved through a 100-mesh sieve with the $Si_3N_4$ ball, and metal powder slurry is dried. The metal powder slurry is dried in a drying machine at a temperature of 80° C. for 30 minutes.

Such primary mixing work is a necessary process for improving the flowability of metal particles during printing with paste for screen print, by sphericalizing the metal particles while ball milling is performed.

Besides, the dried metal mixed powder is secondarily mixed for 48 hours with the $Si_3N_4$ ball in the $Si_3N_4$ pot in which butyl acetate (BA) or butyl carbonate acetate (BCA) is put as a solvent, α-terpineol or di-butyl phthalate (DBP) is put as a plasticizer, and ethyl cellulose (E.C) is put as a binder. In this manner, the powder and the binder (E.C) are uniformly mixed in three-roll mill to obtain a paste.

In order to perform copper plate bonding of the $Si_3N_4$ substrate by an active metal paste method, a pretreatment of the $Si_3N_4$ substrate is first performed. The surface roughness of the $Si_3N_4$ substrate is adjusted to reach average roughness of Ra=5 μm by sandblasting. Conditions of the sandblasting include nozzle injection pressure of 0.35 Mpa, an injection angle of 30°, alumina #240 as sand particles, and a transfer speed of 20 cm/min.

The printing is performed with the paste by using a 325-mesh stainless steel screen.

Besides, in order to remove an organic solvent from the printed substrate, the printed substrate is dried for ten minutes in a drying machine in which a temperature of 120° C. is maintained, and the firing is performed by putting the substrate on a setter and maintaining the highest temperature of 950° C. for ten minutes in a vacuum furnace at a temperature increase speed of 20° C./min.

Fired paste adhering strength was measured as the joining strength obtained by performing soldering on a 2×2 mm pad pattern, attaching a tin coated wire having a wire diameter of 0.8 mm, fixing the substrate horizontally, bending and fixing the wire at an angle of 90° to a jig of the push-pull test, then gradually pulling the wire at a speed of 1.25 cm/min.

Measurement results of peel strength in accordance with a strength test of the active metal bonding substrate are illustrated in Table 2 below. Here, the measurement was performed by using a peel strength tester as measurement equipment.

TABLE 2

| Sample Names | Joining Strength (N/mm) | | | | Number of Samples |
|---|---|---|---|---|---|
| | Lowest Value | Highest Value | Average | Range | |
| 1 | 24.0 | 28.8 | 26.8 | 4.8 | 5 |
| 2 | 26.4 | 30.4 | 28.0 | 4.0 | 5 |
| 3 | 27.6 | 32.4 | 30.0 | 4.8 | 5 |
| 4 | 29.6 | 34.0 | 32.0 | 4.4 | 5 |
| 5 | 24.8 | 32.0 | 28.8 | 7.2 | 5 |
| 6 | 23.6 | 30.8 | 27.6 | 7.2 | 5 |
| 7 | 25.6 | 31.2 | 28.4 | 5.6 | 5 |
| 8 | 25.6 | 32.0 | 29.2 | 6.4 | 5 |
| 9 | 19.2 | 26.0 | 22.4 | 6.8 | 5 |
| 10 | 18.8 | 24.8 | 21.2 | 6.0 | 5 |
| 11 | 16.0 | 22.8 | 20.0 | 6.8 | 5 |

Example 1

Mixed powder was produced by adding 3 wt. % of $Y_2O_3$ and 1 wt. % of $La_2O_3$ as a sintering aid to 10 wt. % of aluminum nitride powder having a β-phasing rate of 90% or higher and 86 wt. % of α-type aluminum nitride powder. Then, the mixed powder was put together with a nylon ball of a grinding media in a resin ball mill pot containing a toluene/butanol solution including 2 wt. % of amine-based dispersant, and wet mixing was performed for 48 hours.

In this case, 15 parts by weight of polyvinyl butyral (PVB) organic binder and 5 parts by weight of a plasticizer (dimethyl phthalate) were added with respect to 100 parts by weight of the mixed powder in the pot, and the wet mixing was performed for 48 hours to obtain a slurry.

The slurry was formed into a green sheet by a doctor blade method, the obtained green sheet was heated at a temperature of 400 to 700° C. for two to five hours in the air, and thereby the organic binder was removed.

A degreased forming body is sintered at a temperature of 1,850° C. for two to five hours in a 1.0 MPa (10 atm) nitrogen atmosphere, left at a temperature of 1,900° C. in the same nitrogen atmosphere for ten hours in 1.0 MPa of mixed gas of nitrogen and hydrogen, and cooled to 1,500° C. at a speed of 100° C. per hour, thereby a silicon nitride sintered body integrated with a surface conductor layer is produced.

The sandblasting method was performed on the surface of silicon nitride to form unevenness, a conductive wiring pattern was printed with Ag—Cu active metal paste containing 2.0 mass % of Ti metal powder, and the brazing heat treatment was performed under a mixed gas atmosphere of nitrogen and hydrogen.

Example 2

Mixed powder was produced by adding 3 wt. % of $Y_2O_3$ and 1 wt. % of $Gd_2O_3$ as a sintering aid to 10 wt. % of aluminum nitride powder having a β-phasing rate of 90% or higher and 86 wt. % of α-type aluminum nitride powder, which was produced in the same manner as described above. An aluminum nitride wiring substrate is produced in the same method as in Example 1 except for the added substances.

Example 3

Mixed powder was produced by adding 3 wt. % of $Y_2O_3$ and 1 wt. % of $Yb_2O_3$ as a sintering aid to 10 wt. % of aluminum nitride (β-type AlN) powder having a β-phasing rate of 30% or higher and 86 wt. % of α-type aluminum nitride powder, which was produced in the same manner as described above. An aluminum nitride wiring substrate is produced in the same method as in Example 1 except for the added substances.

Comparative Example 1

An aluminum nitride wiring substrate is produced in the same method as in Example 1 except that the cooling speed after the sintering is 100° C. per hour, unlike Example 1.

Comparative Example 2

An aluminum nitride wiring substrate is produced in the same method as in Example 1 except that Comparative Example 2 does not include a process of forming unevenness at the surface of aluminum nitride, unlike Example 1.

Comparative Example 3

An aluminum nitride wiring substrate is produced in the same method as in Example 1 except that the cooling speed after the sintering is 100° C. per hour, and Comparative Example 3 does not include a process of forming unevenness at the surface of silicon nitride, unlike Example 1.

As illustrated in Table 3 below, as a result of comparing characteristics of the aluminum nitride (AlN) substrate and the copper-bonding substrate, the joining strength in the examples are 14.7 KN/m or hither, which is higher than that in the comparative examples.

TABLE 3

| Classification | Three-Point Bending Strength (MPa) | Fracture Toughness (MPam$^{1/2}$) | Thermal Conductivity (W/mK) | Joining Strength (KN/m) |
|---|---|---|---|---|
| Example 1 | 280 | 2.7 | 195 | 15.7 |
| Example 2 | 290 | 3.0 | 200 | 15.0 |
| Example 3 | 294 | 3.1 | 210 | 14.7 |
| Comparative Example 1 | 278 | 2.6 | 190 | 4.5 |
| Comparative Example 2 | 281 | 2.9 | 197 | 4.7 |
| Comparative Example 3 | 289 | 3.1 | 200 | 3.5 |

Example 1-1

A green sheet is formed by a tape casting method with a mixed raw material obtained by adding 7 mass % of yttrium oxide ($Y_2O_3$) powder having an average grain size of 0.9 μm and 2 mass % of hafnium oxide ($HfO_2$) powder having an average grain size of 1.0 μm as a sintering aid to silicon nitride powder having an average grain size of 1.0 μm and containing 1.0 mass % of oxygen and 85 mass % of α-phase silicon nitride. The green sheet forming body is increased in temperature from 1,600° C. to 1,900° C. at a speed of 300° C. or lower per hour, left at 1.0 MPa of mixed gas of nitrogen and hydrogen for ten hours, then cooling is performed to 1,500° C. at a speed of 100° C. per hour, and thereby a silicon nitride sintered body integrated with a surface conductor layer is produced.

The sandblasting method was performed on the surface of silicon nitride to form unevenness, a conductive wiring pattern was printed with Ag—Cu active metal paste containing 2.0 mass % of Ti metal powder, and the brazing heat treatment was performed under a mixed gas atmosphere of nitrogen and hydrogen.

Example 2-1

A silicon nitride wiring substrate is produced in the same method as in Example 1 except that silicon nitride powder having an average grain size of 0.7 μm is used, and 6.0 mass % of $Y_2O_3$ powder having an average grain size of 0.9 μm and 2.0 mass % of $Al_2O_3$—AlN powder having an average grain size of 0.5 μm are used as a sintering aid, unlike Example 1.

Example 3-1

A silicon nitride wiring substrate is produced in the same method as in Example 1 except that the sintering temperature is 1750° C., a sintering time is 20 hours, and the cooling speed after the sintering is 100° C. per hour, unlike Example 1.

Comparative Example 1-1

A silicon nitride wiring substrate is produced in the same method as in Example 1 except that the cooling speed after the sintering is 100° C. per hour, unlike Example 1.

Comparative Example 2-1

A silicon nitride wiring substrate is produced in the same method as in Example 1 except that Comparative Example 2-1 does not include a process of forming unevenness at the surface of silicon nitride, unlike Example 1.

Comparative Example 3-1

A silicon nitride wiring substrate is produced in the same method as in Example 1 except that the cooling speed after the sintering is 100° C. per hour, and Comparative Example 3-1 does not include a process of forming unevenness at the surface of silicon nitride, unlike Example 1.

As illustrated in Table 4 below, as a result of comparing characteristics between the silicon nitride ($Si_3N_4$) substrate and the copper-bonding substrate, the joining strength in the examples are 28.0 KN/m or higher, which is higher than that in the comparative examples.

TABLE 4

| Classification | Three-Point Bending Strength (MPa) | Fracture Toughness (MPam$^{1/2}$) | Thermal Conductivity (W/mK) | Joining Strength (KN/m) |
|---|---|---|---|---|
| Example 1-1 | 800 | 6.5 | 95 | 31.0 |
| Example 2-1 | 790 | 6.2 | 90 | 30.5 |
| Example 3-1 | 810 | 6.7 | 87 | 28.0 |
| Comparative Example 1-1 | 780 | 6.0 | 80 | 7.9 |
| Comparative Example 2-1 | 800 | 6.1 | 85 | 10.5 |
| Comparative Example 3-1 | 790 | 5.9 | 90 | 9.8 |

Although the present invention has been described by way of limited embodiments and drawings, the present invention is not limited by this and various modifications and variations can be made by those skilled in the art to which the present invention pertains. Those of ordinary skill in the art related to this embodiment will understand that it may be implemented in a modified form without departing from the essential characteristics of the above-described substrate.

The invention claimed is:

1. A method for manufacturing active metal-brazed a nitride ceramics substrate having excellent joining strength, comprising:
   a step of preparing a mixed raw material by adding 3 wt. % of $Y_2O_3$ and 1 wt. % of one or two rare-earth elements ($La_2O_3$, $Gd_2O_3$, $Ce_2O_3$, $Dy_2O_3$, and $Yb_2O_3$) as a sintering aid to 10 wt. % of aluminum nitride powder having a β-phasing rate of 90% or higher and 86 wt. % of α-type aluminum nitride powder;
   a step of forming a green sheet of the mixed raw material by a tape casting method;
   a step of removing a binder by performing degreasing at a temperature of 400 to 700° C. for two to five hours in a nitrogen gas atmosphere;
   a step of performing sintering at a temperature of 1,800 to 1,900° C. for two to ten hours under 1 to 10 atm of nitrogen and hydrogen gas;
   a step of forming an aluminum nitride sintered substrate by performing gradual cooling at a speed of 50 to 100° C. per hour; and
   a step of printing a conductive wiring pattern with active metal paste on the aluminum nitride sintered substrate.

2. The method for manufacturing active metal-brazed a nitride ceramics substrate having excellent joining strength according to claim 1,
   wherein the active metal paste used in printing the conductive wiring pattern on the aluminum nitride sintered substrate is Ag—Cu paste containing one or two or more active metal selected from the group consisting of Ti, Zr, Hf, Mo, Ta, Nb, $TiO_2$, TiN, $ZrO_2$, ZrN, $Y_2O_3$, and $SiO_2$.

3. A method for manufacturing active metal-brazed a nitride ceramics substrate having excellent joining strength, comprising:
   a step of preparing a mixed raw material by adding 3 wt. % of $Y_2O_3$ and 1 wt. % of one or two rare-earth elements ($La_2O_3$, $Gd_2O_3$, $Ce_2O_3$, $Dy_2O_3$, and $Yb_2O_3$) as a sintering aid to 10 wt. % of aluminum nitride powder having a β-phasing rate of 90% or higher and 86 wt. % of α-type aluminum nitride powder;
   a step of forming a green sheet of the mixed raw material by a tape casting method;
   a step of removing a binder by performing degreasing at a temperature of 400 to 700° C. for two to five hours in a nitrogen gas atmosphere;
   a step of performing sintering at a temperature of 1,800 to 1,900° C. for two to ten hours under 1 to 10 atm of nitrogen and hydrogen gas;
   a step of forming an aluminum nitride sintered substrate by performing gradual cooling at a speed of 50 to 100° C. per hour;
   a step of printing a conductive wiring pattern with active metal paste on the aluminum nitride sintered substrate; and
   a step of forming unevenness at a surface of the aluminum nitride sintered substrate by a sandblasting method to further increase the joining strength.

\* \* \* \* \*